Dec. 7, 1943.   H. G. MANN   2,336,363
LUNCH KIT OR SIMILAR DEVICE
Filed Jan. 9, 1943
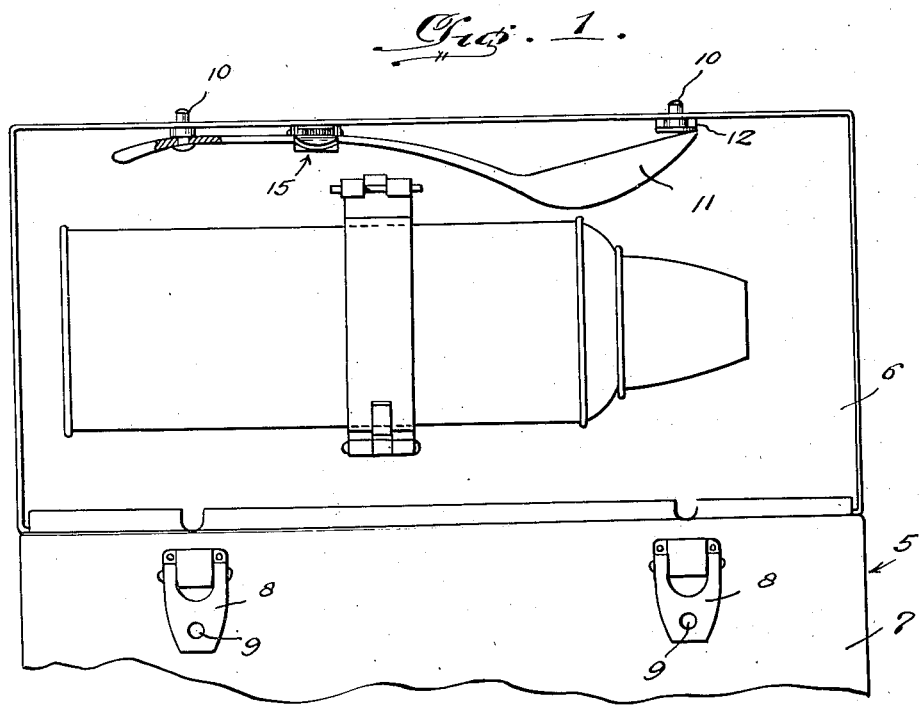
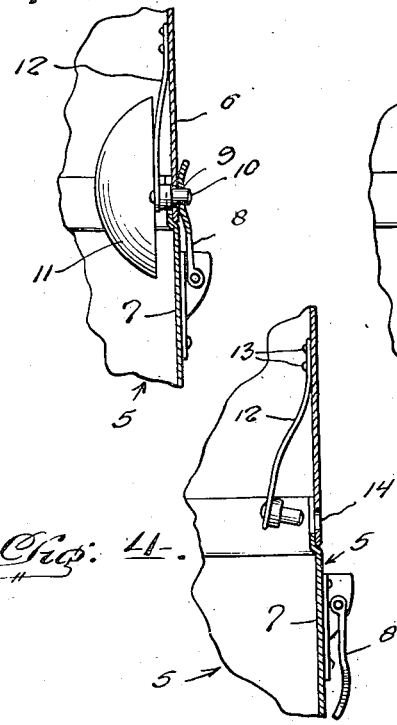
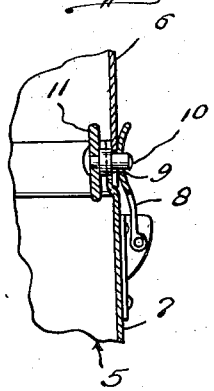
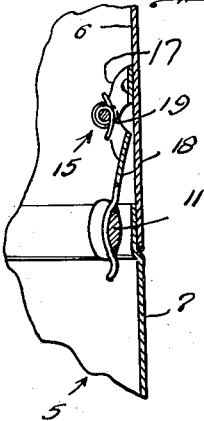
Inventor
Howard G. Mann,
Attorneys Patented Dec. 7, 1943

2,336,363

UNITED STATES PATENT OFFICE 2,336,363

LUNCH KIT OR SIMILAR DEVICE

Howard G. Mann, Bremerton, Wash.

Application January 9, 1943, Serial No. 471,871

2 Claims. (Cl. 206—4)

This invention relates to lunch kits and similar devices and more particularly to a cover latching means therefor, and has for the primary object the provision of a latching means wherein an eating utensil must be employed in conjunction therewith before said latching means can be made to secure the cover of a kit or similar device closed which will eliminate the omission of the eating utensil from the kit and the person not having said eating utensil at hand when the contents of the kit is to be eaten.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a fragmentary front elevation illustrating a lunch kit with a cover in an open position and showing the eating utensil applied to said cover for coaction with the latching means to secure said cover in a closed position.

Figure 2 is a fragmentary transverse sectional view showing the cover closed and latched with the utensil coacting with one of the latching elements.

Figure 3 is a view similar to Figure 2 showing the utensil coacting with one of the other latching elements.

Figure 4 is a view similar to Figures 2 and 3 showing one of the latches in a released position and the utensil removed.

Figure 5 is a view similar to Figures 2 and 3 showing the means of removably mounting the utensil on the cover.

Referring in detail to the drawing, the numeral 5 indicates a fragmentary portion of the body part of a conventional type of lunch kit and 6 the hinged cover for opening and closing the body part. The front wall 7 of the body part of the lunch kit is equipped with the usual spring influenced pivotal latch elements 8 apertured, as at 9, for receiving lugs 10 carried by the cover 6. In the conventional type of lunch kits the lugs 10 are fixed to the cover against movement so that when the cover is in a closed position the latch elements 8 may engage therewith and thereby releasably secure the cover in a closed position. Quite frequently when packing lunch kits of this type with a lunch, the eating utensil is omitted. Therefore, it is the purpose of the present invention to so arrange the lugs 10 on the cover that an eating utensil 11 must be mounted in the cover before the lugs will assume a position that will permit the latch elements 8 to engage therewith when the cover is closed.

In adapting the present invention to the lunch kit, one of the lugs 10 is secured on the cover by a leaf spring 12 the lug being fastened thereto adjacent one end while the opposite end of the leaf spring is riveted on the inner face of the cover, as at 13. The other lug 10 is secured to the handle of the eating utensil, as clearly shown in Figure 1.

The cover is provided with openings 14 through which the lugs may move when the eating utensil 11 is mounted in the cover, as shown in Figure 1.

A spring clip 15 is mounted on the interior of the cover between the openings 14 and is employed for removably mounting the eating utensil in the cover with the lugs 10 protruding through the openings 14 so that they may be engaged by the latch elements 8 when the cover is in closed position.

Thus it will be seen that in order to secure the cover in a closed position by the latch elements 8, the eating utensil must first be mounted within the cover as specified to bring the lugs 10 in proper position to be engaged by the latching elements when swung upwardly so that the lugs may enter the openings 9, consequently obviating any possibility of the eating utensil being omitted from the lunch kit when the latter has been packed with food. Should the eating utensil be omitted from the cover and the latter swung into a closed position and the latch elements 8 swung upwardly, the lug 10 which is carried by the leaf spring will be in a retracted position and not protruding from the cover so that should the latch elements be moved into fastening position the cover would immediately swing open if lifted by its handle thus notifying the person that the eating utensil has been omitted from the kit.

The spring clip 15 consists of a bracket 17 mounted on the inner wall of the cover and a pivoted arm 18 carried thereby and influenced by a spring 19 to cause the arm 18 to swing toward the cover so that when the utensil is placed within the cover and the arm 18 overlying the same, the spring 19 acts to shove the utensil tightly against the cover with the lug carried thereby protruding through one of the openings 14 and the other lug being forced through the opening opposite thereto by the pressure of the utensil against the spring member 12. The spring 19 is of the coil type mounted upon the pivot of the arm 18 with one end bearing against the arm and the opposite end bearing against the bracket so that its action will be always to urge the arm 18 toward the cover thus tightly securing the eating utensil in place within the cover when engaged therewith and provides a construction which will permit the eating utensil to be easily and quickly removed when it is desired to employ the utensil for eating the food contained within the kit.

While I have shown and described the preferred embodiment of my invention, it will be understood that minor changes in construction, combination and arrangement of parts may be made without departing from the spirit and scope of the invention claimed.

Having thus described my invention, what I claim is:

1. In combination with a lunch kit including a box having a hinged cover provided with openings and latch elements mounted on the box and movable into and out of latching positions, keeper lugs movable through and from the openings and adapted to be engaged by the latch elements for securing the cover closed, an eating utensil removably mounted on the cover and carrying one of the lugs, and means yieldably mounting the other lug on the cover and engaged by the eating utensil on the application of the latter to the cover.

2. In combination with a lunch kit including a box having a hinged cover provided with openings and latch elements mounted on the box and movable into and out of latching position, keeper lugs movable through and from the openings and adapted to be engaged by the latch elements and extending through said openings for securing the cover closed, a spring clip carried by the cover, an eating utensil removably mounted on the cover by said spring clip carrying one of the lugs to pass through one of the openings and adapted to engage the other lug for moving the latter through its respective opening, and a spring member attaching the last-named lug on the cover.

HOWARD G. MANN.